United States Patent Office 2,874,840
Patented Feb. 24, 1959

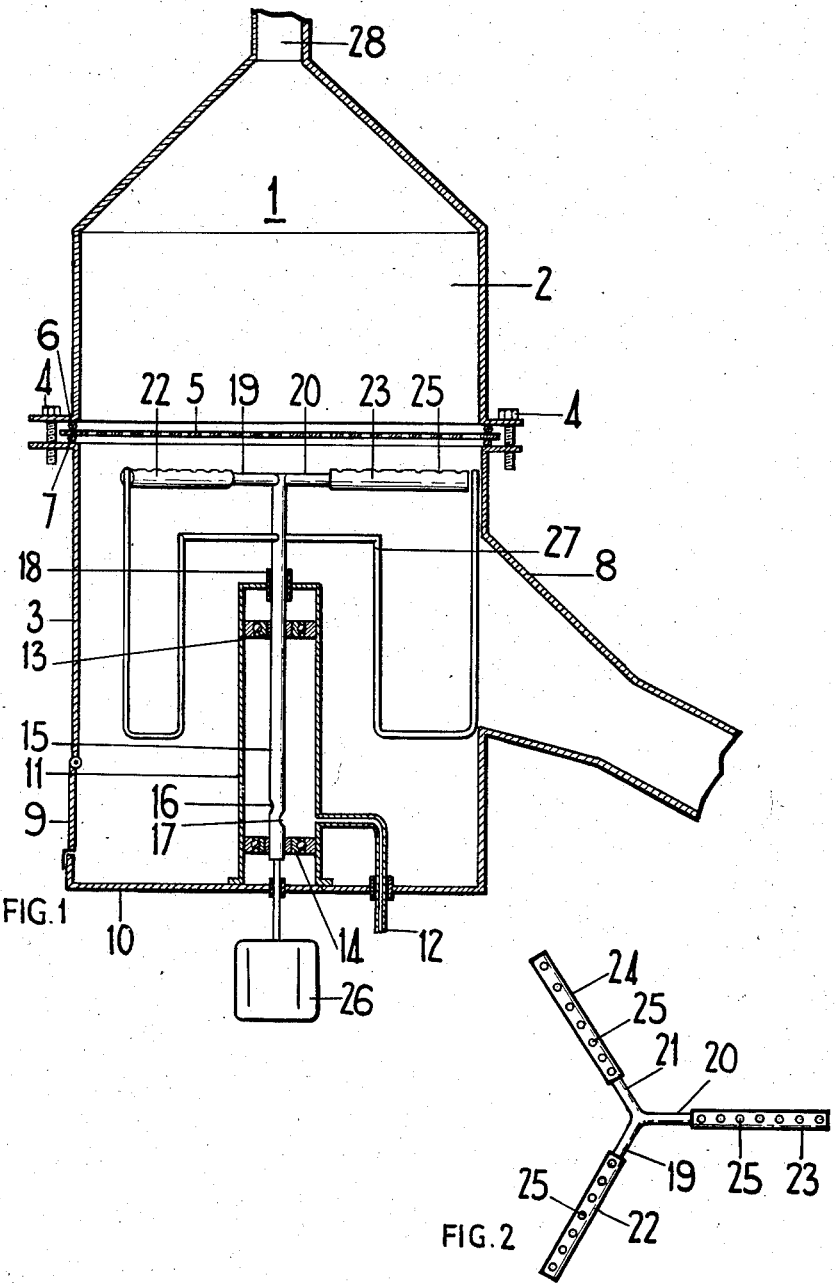

2,874,840

METHODS OF SEPARATING OR CLASSIFYING MATERIALS

Robert Michael Simpson, Wembley, England, assignor to Columbian-General Blacks Limited, London, England Application September 23, 1955, Serial No. 536,181

Claims priority, application Great Britain September 24, 1954

2 Claims. (Cl. 209—250)

This invention relates to methods of separating or classifying granular, powdered or the like materials, and relates particularly to those methods of the type in which the material to be separated or classified is carried by a fluid stream and the stream is intercepted by a sieve or screen, the finer particles of the material passing through the sieve or screen and the coarser particles being retained by it.

Considerable difficulty has been experienced in the classifying or separating of some materials by this method, particularly materials such as carbon black and the like which tend to cake very easily and block the holes in the sieve or screen, thus making the process long and often impracticable. Use of a rotating brush to sweep the sieve or screen has little or no effect in that it only serves to remove the material from the surface of the sieve or screen and leaves the holes blocked.

One object of the present invention is the provision in a separating or classifying method of means to prevent or substantially to prevent blocking of the sieve or screen.

According to one aspect of the present invention, in a method of separating or classifying granular, powdered or the like material and of the type referred to, a jet or jets of fluid impinges or impinge on that side of the sieve or screen to which the material is fed by the fluid stream to prevent or substantially to prevent the sieve or screen from blocking by the material.

The jet or jets may be arranged to move across or relative to the sieve or screen and by suitable movement of the jet or jets a vortex may be produced. It may also be advantageous for the jet or jets of fluid to impinge obliquely on the sieve or screen.

One form of apparatus for carrying out the method of the present invention, particularly suitable for the separation of carbon black, will now be described by way of example with reference to the accompanying drawing in which Figure 1 shows, somewhat diagrammatically, a central vertical section of the apparatus, and Figure 2 shows a top plan view of a detail.

Referring now to the drawing, the separating apparatus comprises a vertically disposed cylindrical vessel 1 which tapers toward its upper end. The vessel 1 has an upper part 2 which is removable from a lower part 3 and the two parts 2 and 3 are clamped together by bolts 4. A sieve 5 is disposed horizontally across the vessel 1 between the upper part 2 and the lower part 3 and sealing of the joint between the parts 2 and 3 is effected by sealing rings 6 and 7, one on each side of the sieve 5. The lower part 3 of the vessel 1 is provided with an inlet pipe 8 for air and carbon black whilst a door 9 provides access to a collecting drum 10 formed as a lower extension of the part 3.

Mounted concentrically in the vessel 1 and sealed from it is a cylindrical tube 11 closed at both ends and having an inlet pipe 12. Mounted in bearings 13 and 14 on the axis of the tube 11 is a hollow shaft 15 having inlet apertures 16 and 17. The shaft 15 projects through a seal 18 in the closed top of the tube 11 and is formed with three arms 19, 20 and 21 which are provided with screw threads and to which are screwed tubular members 22, 23 and 24 to form a three armed spider. The tubular members 22, 23 and 24 are provided with holes 25 and closed at their free ends. The hollow shaft 15 is connected to the driving shaft of an electric motor 26 (through gearing if necessary and through an oscillating mechanism if oscillatory motion is required). Scraper arms 27 which are attached to the shaft 15 are provided to prevent the building up of the material on the walls of the lower part 3 of the vessel 1. Air is arranged to be fed under pressure to the pipe 12, issues from the holes 25 in the tubular members 22 to 24 and impinges on to the underside of the sieve 5, the holes 25 being disposed along the tops of the tubular members 22 to 24. On rotation of the shaft 15 the air jets impinge on the whole area of the underside of the sieve 5 and a spiral or vortex effect is produced near the sieve.

In operation of the apparatus described above, the air stream containing the suspended carbon black is drawn through the separator by means of a fan (not shown) attached to an outlet 28 of the vessel 1. When the air stream approaches the sieve 5 the jets of air issuing from the holes 25 accelerate it and also give it a swirling motion both of which actions facilitate the passage of the carbon black through the sieve, any blocking of the sieve which may occur being cleared by the air jets impinging on it. The coarser fraction which is mainly grit and which does not pass through the sieve is swept to the side by the horizontal vortex and falls into the drum 10.

In one experiment using a 4″ diameter sieve an air stream containing carbon black at a concentration of 250 grains per cubic foot was drawn through a 72 B. S. screen at a speed of 80 cubic feet per minute (atmospheric pressure). Air jets at a pressure of 60 pounds per square inch were used at a rate equivalent to 20 cubic feet per minute of air at atmospheric pressure and the spider was rotated at 200 R. P. M. Under these conditions the carbon black was put through the sieve without stoppages due to blocking.

A controlled air jet may be positioned in the collecting drum 10 of the vessel 1 for agitating the coarser fraction and carrying back into the main air stream any fine carbon black which has dropped into the drum.

I claim:

1. A continuous method of separating or classifying granular, powdered or the like material comprising: suspending said material in a gaseous stream, directing said stream upwardly against a non-vibratable sieve or screen which keeps back the coarser particles of said material but allows the finer particles to pass through it, and independent of said stream impinging gaseous jets at a pressure of the order of 60 lbs. per square inch directly on the underside of said sieve or screen to accelerate the flow of said gaseous stream and material through the sieve or screen and to clear any particles blocking the sieve or screen.

2. A continuous method of separating or classifying granular, powdered or the like material as claimed in claim 1, in which the jets are moved relatively to said sieve or screen to produce a vortex.

References Cited in the file of this patent

UNITED STATES PATENTS

| 1,530,193 | Montgomery | Mar. 17, 1925 |
| 2,732,068 | Howe | Jan. 24, 1956 |
| 2,734,631 | Kobliska | Feb. 14, 1956 |